US006914540B2

(12) United States Patent
Gongolas

(10) Patent No.: US 6,914,540 B2
(45) Date of Patent: Jul. 5, 2005

(54) TRAFFIC AREA SIGNAGE SYSTEMS

(76) Inventor: Christopher Gongolas, 101 Westcott St., Houston, TX (US) 77007

( * ) Notice: Subject to any disclaimer, the term of this patent is extended or adjusted under 35 U.S.C. 154(b) by 497 days.

(21) Appl. No.: 10/090,457

(22) Filed: Mar. 4, 2002

(65) Prior Publication Data

US 2003/0164753 A1 Sep. 4, 2003

(51) Int. Cl.[7] .............................. B60Q 7/00; E01F 9/00; G08G 1/00

(52) U.S. Cl. ................................ 340/908.1; 340/932.2; 340/937; 340/927; 340/505; 340/942; 40/612; 40/463; 40/584; 404/12; 404/13

(58) Field of Search .......................... 40/584, 612, 463; 404/12, 13; 340/908.1, 932.2, 937, 927, 505, 506, 942

(56) References Cited

U.S. PATENT DOCUMENTS

| | | | | | |
|---|---|---|---|---|---|
| 3,340,091 | A | | 9/1967 | Zweig | 117/138.8 |
| 3,399,607 | A | | 9/1968 | Eigenmann | 404/19 |
| 3,788,755 | A | * | 1/1974 | Davis | 404/1 |
| 4,020,211 | A | | 4/1977 | Eigenmann | 428/323 |
| 4,063,878 | A | | 12/1977 | Weeks | 8/2.5 A |
| 4,069,281 | A | | 1/1978 | Eigenmann | 264/1 |
| 4,149,320 | A | | 4/1979 | Troyer et al. | 33/137 R |
| 4,310,890 | A | | 1/1982 | Trehn et al. | 364/467 |
| 4,535,974 | A | * | 8/1985 | Conde | 256/1 |
| 4,598,003 | A | | 7/1986 | Renholts | 428/40 |
| 4,944,514 | A | | 7/1990 | Suiter | 273/51 |
| 5,524,373 | A | | 6/1996 | Plumly | 40/600 |
| 5,536,569 | A | | 7/1996 | Lasch et al. | 428/328 |
| 5,565,843 | A | * | 10/1996 | Meyvis | 340/691.6 |
| 5,622,759 | A | | 4/1997 | Fuster | 428/40.2 |
| 5,678,337 | A | | 10/1997 | Ashoori | 40/594 |
| 5,851,614 | A | | 12/1998 | Buck | 428/40.1 |
| 5,947,635 | A | | 9/1999 | Wilson, Sr. | 404/72 |
| 5,968,624 | A | | 10/1999 | Liebe, Jr. | 428/40.1 |
| 5,980,664 | A | | 11/1999 | Wilson, Sr. | 1156/71 |
| 5,993,927 | A | | 11/1999 | Sugita et al. | 428/40.2 |
| 6,020,073 | A | | 2/2000 | Wilson, Sr. | 428/489 |
| 6,042,914 | A | | 3/2000 | Lubar | 428/41.4 |
| 6,048,595 | A | | 4/2000 | Nakajima et al. | 428/40.1 |
| 6,061,940 | A | | 5/2000 | Rice | 40/594 |
| 6,090,461 | A | | 7/2000 | Frank et al. | 428/40.1 |
| 6,107,942 | A | * | 8/2000 | Yoo et al. | 340/932.2 |
| 6,180,228 | B1 | | 1/2001 | Mueller et al. | 428/354 |
| 6,217,252 | B1 | | 4/2001 | Tolliver et al. | 404/77 |
| 6,312,152 | B2 | * | 11/2001 | Dee et al. | 368/90 |
| 6,576,074 | B1 | * | 6/2003 | Cabrera et al. | 156/71 |

FOREIGN PATENT DOCUMENTS

| | | | |
|---|---|---|---|
| FR | 1055226 | A | 2/1954 |
| GB | 2346737 | | 8/2000 |
| GB | 2354626 | A | 3/2001 |
| WO | WO 0184902 | A | 11/2001 |

* cited by examiner

*Primary Examiner*—Tai T. Nguyen
(74) *Attorney, Agent, or Firm*—Guy McClung

(57) ABSTRACT

A signage system for a traffic area, the traffic area comprising visually-identifiable boundary markers, the signage system having sign means at the boundary markers, the sign means visually viewable by an occupant of a vehicle adjacent the boundary markers. The signage system further having interaction apparatus at the parking lot for providing communication between a vehicle occupant and an entity remote from the traffic area. The signage system wherein the sign means has at least one electronic display apparatus for presenting information to a person at the traffic area.

16 Claims, 3 Drawing Sheets

TRAFFIC AREA SIGNAGE SYSTEMS

BACKGROUND OF THE INVENTION

1. Field of the Invention

This invention is directed to signage systems in or on pavement, concrete, flooring, and the like and such systems for pedestrian walkways and for traffic areas and parking areas, e.g. garages and parking lots; to methods for providing advertising in parking areas near such areas; and, in certain particular aspects, to such systems which are interactive.

2. Description of Related Art

There are a variety of prior art devices, systems, and methods for marking flooring and the pavement of pedestrian walkways, roadways, sidewalks, garages, and parking lots ("pavement etc."). It is known to provide marking with a series of plain straight white or yellow lines with marking tape, marking material or paint. Reflective tape, reflectors, lights, upstanding-objects, and embedded plastic or glass objects are used as markers, e.g. to indicate lanes, runways, spaces, and turn directions. Numbered spaces with numbers on pavement are common in parking lots and parking garages. Also, pavement signage is used to mark special and reserved spaces as well as "no parking" spaces. The prior art also discloses bricks embedded in pavement bearing viewable indicia and advertising.

U.S. Pat. No. 4,020,211 discloses a material laid down and adhesively secured on a road surface to provide a traffic regulating sign, the material having an upper surface exposed to traffic and a plurality of sharp tips projecting above the surface for imparting good non-skid properties. The material has an upper layer adjacent to the upper surface, at least partially embedding hard particles to form sharp tips made of a polymeric resin having a high molecular cohesion such as a polyamide resin, a polyurethane resin or a polyterephthalic resin, with improved wear resistance, non-skid, and high visibility properties.

U.S. Pat. No. 4,063,878 discloses a method for imprinting permanent indicia on back-sized pressure-sensitive adhesive tapes by contacting the tape with a heat-sublimable dye source material in conjunction with a stencil or raised relief-imaged heat-conductive platen, and raising the temperature to a point sufficient to vaporize the dye, whereupon at least a portion of the dye penetrates through the backsizing to become absorbed in the flexible tape backing. The image contained on the tape is permanent, smudge-proof and abrasion-resistant.

U.S. Pat. No. 4,149,320 discloses a measuring tape that has a pressure-sensitive adhesive tape with a minimum stretchability adapted to be permanently secured onto a suitable base, and which has imprinted thereon at least one numerical scale and a plurality of a spaced series of coded indicia for use as templates to position particular structural members.

U.S. Pat. No. 4,598,003 discloses an imprintable tape and a method for forming and imprinting the tape which includes an opaque film portion formed from polytetrafluoroethylene and a layer of material of contrasting color laminated to the opaque film so that upon application of compressive force to a selected surface portion of the film, unique characteristics of the polytetrafluoroethylene in the opaque film cause it to become transparent within the selected surface portion and thereby form a contrasting indicia or design by the resulting exposure of the underlying tape or surface. One embodiment of the tape employs an underlying surface to which the tape is applied for forming the contrasting indicia or design exposed by compressing part of the tape. In one embodiment a contrasting colored surface is formed beneath the opaque film. In another embodiment there is an adhesive layer covered by a removable or peelable backing for securing the tape to a surface. In another embodiment there is a protective film overlying the opaque polytetrafluoroethylene film.

U.S. Pat. No. 5,524,373 discloses floor advertisement apparatus used in a cavity formed in the floor of a building. A lower holding layer is located and secured in the bottom of the cavity. An upper holding layer with an opening extending therethrough has a transparent layer secured to one side of the upper holding layer. The transparent layer and the upper holding layer are located in the cavity. An advertising layer is secured to the lower side of the transparent layer within the opening for viewing from above. Both of the holding layers may be magnetic material or one can be magnetic material and the other metal attracted by magnetic lines of force for removably holding the upper layer to the lower layer when the two layers are located next to each other such that the transparent layer with its advertising layer is removably held in the cavity. In another embodiment, a support layer is secured in the cavity. The transparent layer has a layer of adhesive material secured to its bottom side defining an opening which is covered by the transparent layer. The layer of adhesive material has a lower side adapted to be removably secured to the upper side of the support layer. An advertising layer can be removably located below the transparent layer within the opening or it can be secured to the bottom side of the transparent layer with the opening such that it can be viewed from above.

U.S. Pat. No. 6,061,940 discloses a marker and method for use on roads for locating underground utilities utilizing a flexible tile constructed of front and backing layers of fused plastic having openings for receiving screws extending into corresponding holes drilled in the road surface for holding the tile while an adhesive backing sets and for assuring affixation thereafter. Suitable symbols are formed into the tile by grinding away the front layer. All the components may be provided in a package utilizing a box or other container.

U.S. Pat. No. 3,399,607 discloses a marked road with a roadway surface for vehicles; a first strip of road marking tape having relatively low non-skid properties and high light reflectivity joined to the upper face of the roadway surface; and another strip formed of a material having non-skid properties and a lesser light reflectivity than the first strip of road marking tape and having a lesser width than the first strip extending in longitudinal direction and adhered to the first strip equally spaced from its lateral edges so as to provide together with the first strip a composite surface formed of two spaced edge portions of the first strip of road marking tape having relatively low non-skid properties and high light reflectivity and of the other strip forming a center portion having non-skid properties and a lesser light reflectivity interposed between two spaced edge portions of said first strip. In one aspect the portions having non-skid properties are arranged in a row of spaced elements equally spaced from the lateral edges of the first strip.

The present inventor is unaware of: any system which employs parking area pavement signage as advertising; any system which uses such signage as advertising for an entity with a place of business at, adjacent, or near such a parking area; or any such system that enhances customer awareness of a particular entity (business, company, retailer, etc), its products, and/or its location. Applicant is unaware of any such system which is interactive so that a customer at a parking space may either receive prerecorded information or may communicate in real time with a person (nearby or remote), database, or website.

There has long been a need, recognized by the present inventor, for a parking area signage system that promotes customer relations and enhances customer awareness of a business entity adjacent a pedestrian walkway, traffic area or parking area. There has long been a need, recognized by the present inventor, for such a system with interactive features so that a consumer may communicate in real time with a person (or other entity or system) on site at a business entity adjacent such an area or remote therefrom.

SUMMARY OF THE PRESENT INVENTION

The present invention, in certain embodiments, discloses a signage system in and/or on flooring or pavement that includes identifying indicia for one or more entities. These indicia include, but are not limited to, the entity's name; the entity's logo; internet website address; service marks; trade names; brand messages; and/or trademark(s); a phone number for the entity; information on the entity's location with respect to the flooring or pavement and directions (verbal and/or directional arrows) regarding how to get from a particular space or area to the location of the entity; a radio setting to receiving information about the entity; a phone number for management and/or security personnel; a phone number for an escort from the area to the entity; and information regarding distance from a particular area location, (e.g., from a particular space) to an entity.

The present invention, in certain embodiments, provides in or on flooring or pavement an interaction apparatus and/or medium at a particular location and/or at a particular space which permits a person to activate the apparatus, e.g. by touch, by voice, by light sensor apparatus, by stepping on a push-pad, button, or embedded structure or structures, including 1. hearing and/or seeing prerecorded messages (sound and/or video) about locations, directions, time of operation, etc., and/or by sensing a vehicle that has occupied an area or parking space; and/or 2. speaking in real time directly to a person or persons (remotely located, nearby, or on site) with requested information and/or person(s) actually on site at a business or entity, in one aspect an entity adjacent the location.

For various systems and methods as described herein a parking space, sidewalk, roadway, pedestrian walkway or traffic are may be marked or identified with any suitable known material, apparatus, object, system or method. In certain aspects according to the present invention images (wording, symbols, ads, ad messages, logos, product names, brand names, trade names, company names) are made (printed, silk-screened, transferred, digitally transferred on traffic marking tape, painted on a substrate, painted on a printed substrate, etc.) on a traffic marking tape substrate. The images may be arranged in series end-to-end and/or side-by-side on the tape in either repeating, random or patterned series. The tape may be any width, including, but not limited to, the typical known widths for traffic marking tape: three inches, four inches; between five and eleven inches; one foot to three feet; and a colored border e.g. but not limited to a white or yellow border, may be used on any of the tape. One or more protective layers or laminates may be applied over the layer with images. In one aspect such a layer or layers may include reflective material. Alternatively, the ads, etc. are simply painted on the parking areas by hand or with printing machines or apparatuses, e.g., but not limited to, inkjet printing apparatuses.

Signage according to the present invention for sidewalks, flooring, pedestrian areas or vehicle areas, walkways or roadways may include electrical flat screens, video screening or panels, and back-lit screens or panels and/or electronic video monitors or panel displays. Such screens or panels may be embedded in or attached on flooring, pavement, curbs or roadways. Screens and/or panels on roadways may be of sufficient size to be viewable from a moving vehicle and multiple screens and/or panels may, according to the present invention, be sufficiently spaced-apart so that each screen or panel is viewable individually; or, in one aspect, an entire area, e.g. a crosswalk may be on one large video or static display or image. Such screens and/or panels may also be used to provide markers and landmarks for viewing from above the roadway (e.g. from a plane or helicopter). Selectively operable switch apparatus may be provided so that a person may turn on or off light apparatus associated with a screen or panel.

In one aspect curbs, crosswalks, roadways, and parking lots are marked and/or lined with molded plastic material, e.g. but not limited to Lexan™ material which may have active or passive lighting behind it.

In one aspect according to the present invention a camera is embedded in pavement etc. and a person at that location may be viewed by a person remote from the pavement, etc. Embedded screens and/or panels according to the present invention may be part of a video system.

It is, therefore, an object of at least certain preferred embodiments of the present invention to provide: New, useful, unique, efficient, nonobvious signage systems and methods for pavement, flooring, crosswalks, sidewalks, parking area and roadways.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

Figure 1:
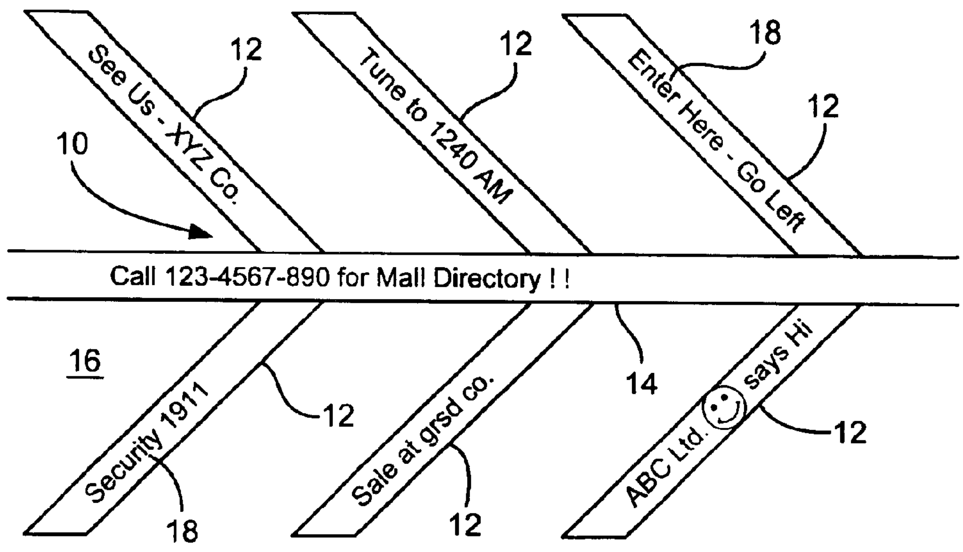
FIG. 1 is a top schematic view of one parking lot signage system according to the present invention.

FIG. 1 shows a parking (or garage) lot signage system 10 according to the present invention which has a plurality of parking space lines 12 and a middle main line 14 (such lines may be "boundary markers"). It is to be understood that it is within the scope of this invention to have any desired number of space lines 12 and main lines 14 and that only part of or all of a parking lot may have such lines.

Various logos and information is on the space lines 12 and main lines 14. It is within the scope of this invention to present this information on tape that is applied to pavement, by painting the information onto the lines, by using clear plastic pieces or panels with information thereon or therein, by embedding information-bearing panels or plaques, or by etching it into existing lines and/or pavement.

The lines may present any desired information, including but not limited to, a security/help phone number, "Security 1911"; notice of a sale, "Sale at grsd co."; company identifier and/or logo, "ABC Ltd. ☺ Says Hi"; directions to a nearby location, "Enter Here—Go Left"; a radio frequency to tune into for information, "Tune to 1240 AM"; company identifier or trade name, "See Us—XXX Co."; and/or a general directory or information phone number, "Call 123-4567-890 for Mall Directory !!" This information may also be presented by any screen, panel and/or lighting system described herein. Images, logos, and/or messages and/or a combination thereof can, according to the present invention, be presented to generate advertising revenue; and they can also be used to present community services available to those who view them. Such information may also be presented by and/or in any system disclosed herein according to the present invention, including but not limited to, those of FIGS. 2–10.

Figure 2:
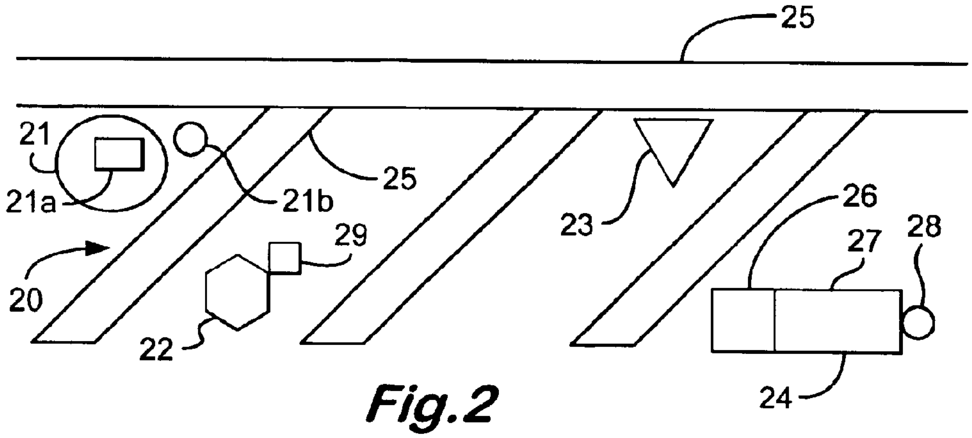
FIG. 2 is a top schematic view of a parking lot signage system according to the present invention.

FIG. 2 shows a system 20 according to the present invention which has one, more than one, or all the information presentation systems 21–24 which are shown in a parking area with lines 25 but which may be embedded in or adhered onto any pavement, parking lot, garage, roadway, stairway, floor, or sidewalk; and such presentation systems may be used in any system as disclosed in FIG. 1 and FIGS. 3–10. Presentation system 21 includes an electronic screen 21*a* viewable by a person in a vehicle nearby or by a person who has exited from a vehicle. The screen may constantly present a single image or single set of information or it may have associated apparatuses and devices for presenting different and/or moving images. Optionally, the presentation system 21 (and, according to the present invention, any component of any system or embodiment according to the present invention) may be activatable by a remote control device 21*b*. The system can be programmed so that only certain remote control devices will activate the presentation system 21 or, alternatively, so that any remote control device, including, but not limited to any or all garage door opener remote control devices, will selectively activate the presentation system 21. Such a remote control device may be used with any interaction apparatus disclosed herein.

Presentation system 22 is a back-lit transparent or translucent panel which may have on it any logo, name, information, etc. disclosed herein. Optionally (and as is true for any electronic or electrically powered screen, panel or apparatus used in any system according to the present invention) a solar power collector/generator device 29 may be connected to the presentation system 22 to provide electrical power to the systems and/or to its lighting apparatus.

Presentation system 23 includes a system with a video screen which can play any desired video and is viewable by persons nearby.

Presentation system 24 has audio output apparatus 26, electronic screen apparatus 27, and interaction apparatus 28. A person can interact with an audio and/or screen presentation with the interaction apparatus, e.g., including but not limited to, a foot pad, touch pad, keyboard, or light sensor. Via such an interaction apparatus (which may be used in any system according to the present invention) a person can request any of the types of information referred to herein and/or can communicate with a database, information provider, and/or personnel regarding security, directions, stores, company locations, etc—personnel either nearby or remote from the parking (or other) area.

Figure 3:
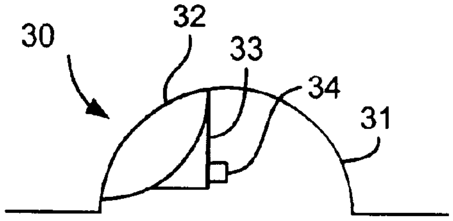
FIGS. 3 and 4 are side cross-section views of a curb signage system systems according to the present invention.

FIG. 3 shows a signage system 30 according to the present invention for use in curbing 31. The system 30 has a presentation panel (or screen) 32 with associated image forming, creating, and/or projection apparatus 33 and power apparatus 34. The power apparatus 34 may be any suitable known power source, including but not limited to, batteries or electrical power lines or a solar power apparatus.

Figure 4:
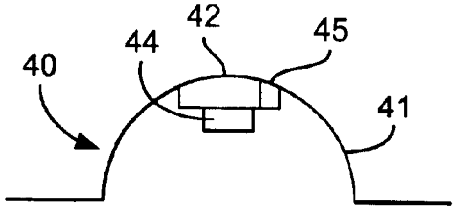

FIG. 4 shows a curb signage system 40 according to the present invention, for curbing 41 with a presentation apparatus 42, power apparatus 44, and solar power generator 45 for providing power to the power apparatus 44 (and any system according to the present invention may use such a solar power generator).

Figure 5:
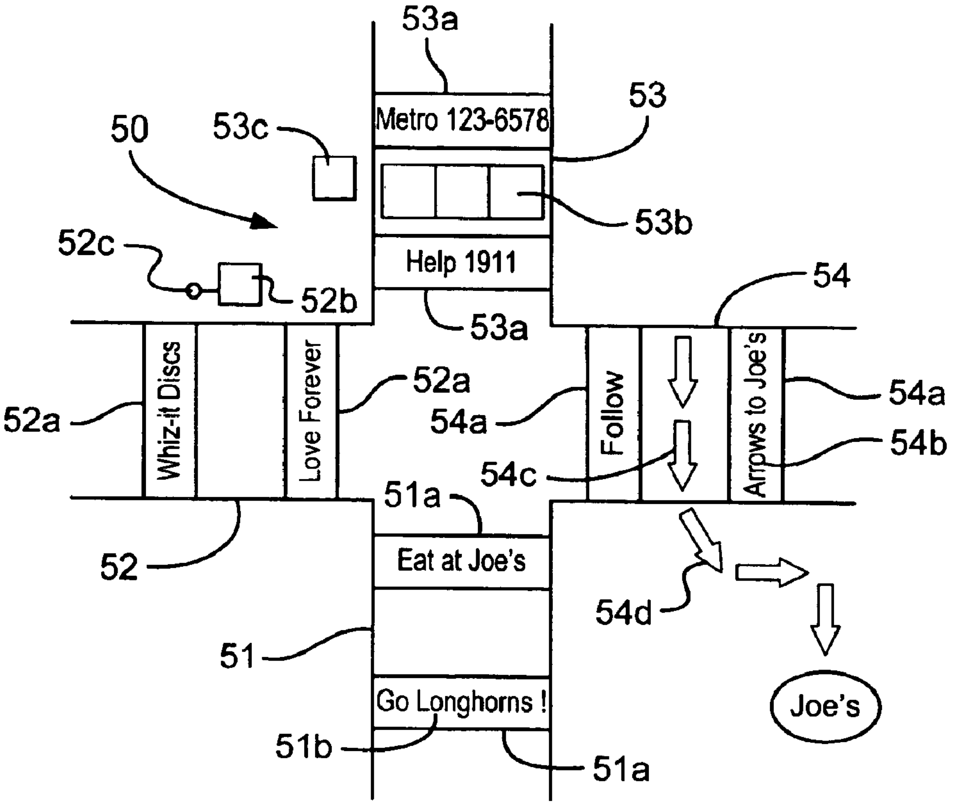
FIG. 5 is a top schematic view of crosswalk signage systems according to the present invention.

FIG. 5 shows a crosswalk signage system 50 according to the present invention whose various components and apparatus may be used in any pavement, etc. system according to the present invention. Also any one or any combination (except one) of components and/or apparatuses in the system 50 may be deleted. A crosswalk 51 lined with lines 51*a* includes advertising, "Eat At Joe's" and a slogan, "Go Longhorns!." A crosswalk 52 lined with lines 52*a* has information on the lines 52*a* and, optionally, a screen (or panel) 52*b* (as any screen or panel described herein) with interaction apparatus 52*c*. The interaction apparatus may be like that of the system 24 (FIG. 2) and may be used to secure any information referred to herein, and/or to communicate with a person or database or information provider near and/or remote from the crosswalk.

A crosswalk 53 lined with lines 53*a* has a plurality of screens 53*b* (or panels) (as any described herein) within the crosswalk and a screen 53*c* (or panel) (as any described herein) adjacent the crosswalk.

A crosswalk 54 lined with lines 54*a* has direction arrows 54*c* (taped, painted, on screen, or on panel) within the crosswalk 54 and direction arrows 54*d* in or on pavement adjacent the crosswalk which direct a person to a location, "Joe's."

Figure 6:
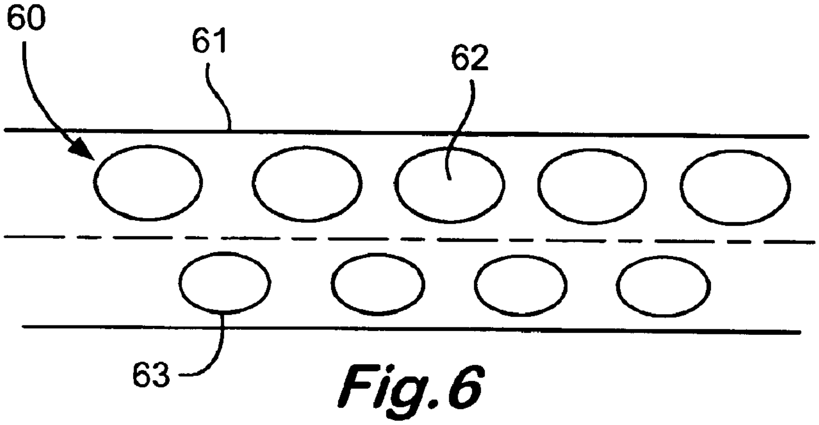
FIG. 6 is a top schematic view of roadway signage systems according to the present invention.

FIG. 6 shows a roadway 61 with a system 60 according to the present invention which has a series of spaced-apart screens 62 (or panels) (as any described herein) which are viewable by a person in a vehicle travelling on the roadway 61 and/or by a person adjacent the roadway 61. In another lane, optionally, may be provided, according to the present invention, another series of spaced-apart screens 63 (or panels) (as any described herein). In one aspect the screens or panels are sufficiently spaced-apart that each can be viewed by a person in a moving vehicle. Alternatively, the screens or panels are spaced closely together so that a single image is apparent to a person in a moving vehicle or their spacing is such that static images viewed sequentially provide an apparently moving image to the viewer.

Figure 7:
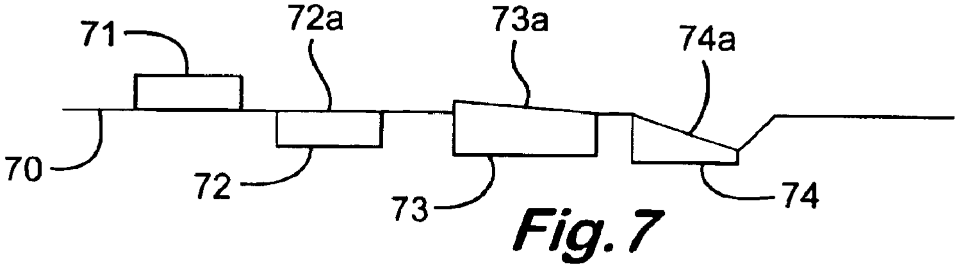
FIG. 7 side cross-section view of a signage system according to the present invention.

FIG. 7 shows a variety of ways according to the present invention that a screen or panel (any disclosed herein) may be placed on, emplaced in or embedded in pavement, etc. Pavement 70 has a screen (or panel) apparatus 71 adhered on its surface, e.g. by any suitable adhesive. A screen (or panel) apparatus 72 is embedded in the pavement 71 with a top viewing surface 72*a* exposed. A screen (or panel) apparatus 73 has a viewing area 73*a* that projects above the pavement 71 and is at a slight angle to facilitate viewing. A screen (or panel) apparatus 74 is recessed within the pavement 71 and no part of a viewing surface 74*a* projects up above the level of the pavement.

Figure 8:
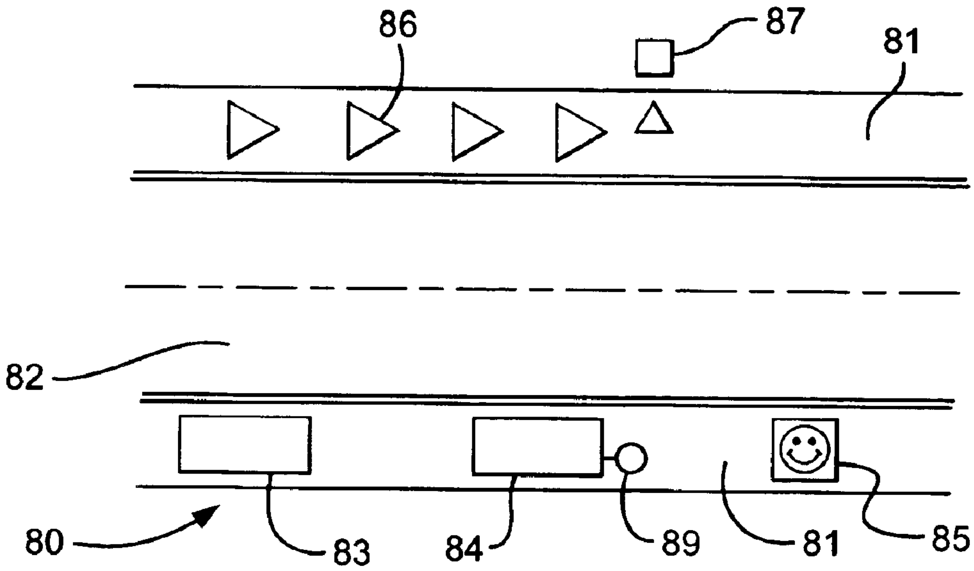
FIG. 8 is a top schematic view of sidewalk signage systems according to the present invention.

FIG. 8 shows a signage system 80 for use in or on sidewalks 81, e.g. along a roadway 82 (and a system 80 or some or all of its components may according to the present invention, be used in any pavement, etc.). The system 80 has a screen (or panel) 83 like any screen or panel disclosed herein for conveying information, etc. Screen or panel 84 has interaction apparatus 89 (like any disclosed herein) for person-to-person or person-to-database (information provider, web site, etc.) interaction. Advertising, etc. is provided on screen or panel 85 and screens or panels 86 serve as direction indicators, e.g. directing a person to a location 87.

Figure 9:
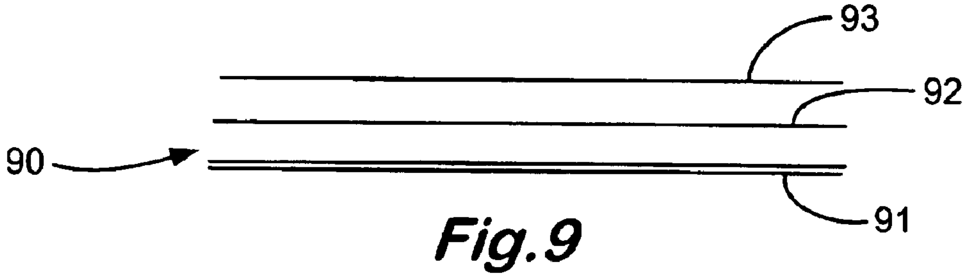
FIG. 9 is a side cross-section view of signage tape for use in systems according to the present invention.

FIG. 9 shows a multi-component tape 90 which includes a substrate 91 over which is placed (which may be laminated or glued to the substrate) a logo-bearing or information bearing tape layer 92. Optionally a protective clear layer 93 may be applied to and/or laminated onto the layer 92. Such tape 90 may be used in any system disclosed herein to mark areas and/or to provide information. The tape may also be back-lit with any lighting apparatus or device disclosed or referred to herein.

Figure 10:
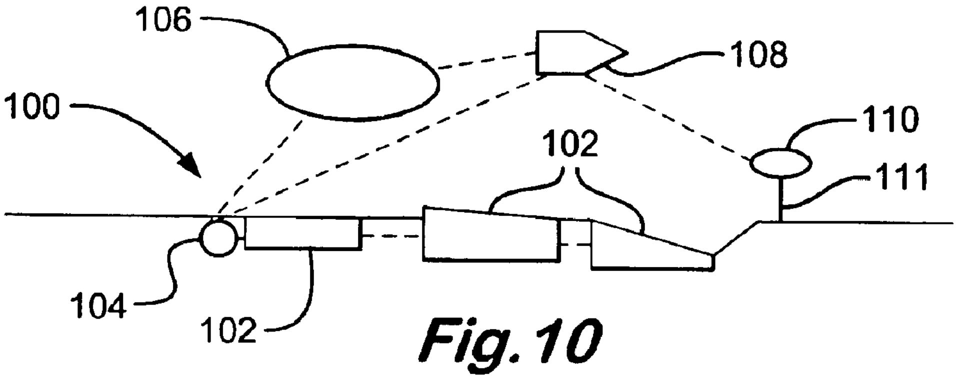
FIG. 10 is a side cross-section view of signage apparatus useful in systems according to the present invention.

FIG. 10 shows a system 100 according to the present invention which includes one or more screens (or panels) 102 (as any screen or panel disclosed herein) which have associated communication apparatus 104 for communication with a remote communication system 106 (e.g., but not limited to, the Internet) and/or for communication either directly or via the system 106 with a remote system 108. The remote system 108 may control the screens 102 and/or be accessed from the location of the screens 102 for interaction with a person at the location. Such connections and communications, and such systems (like the systems 106 and/or 108) may be used with any system according to the present invention. A camera 110 may be mounted adjacent any screen, panel, or part of the system 100, above, in, or on any such part, including, but not limited to, in pavement, on pavement, in a panel, in a screen, or on a support structure such as support 111. The camera 110 may be any known still or video camera, mechanical and/or digital and, in one aspect, it is linked electronically to the remote system 108 (dotted line, FIG. 10, between camera 110 and remote system 108). This camera may be used, inter alia, for surveillance and/or for viewing a person or vehicle near the system 100. Any system or embodiment of the present invention may include a camera 110 in any or all of its aspects.

The present invention, therefore, provides in certain, but not necessarily all, embodiments a signage system for a traffic area, the traffic area with visually-identifiable markers, the signage system including sign apparatus at one, some or all of the markers, the sign apparatus visually viewable by a person or an occupant of a vehicle adjacent the markers. Such a system may have one or some (in any possible combination) for the following: wherein the sign apparatus is within the marker(s); wherein the sign apparatus includes signage from the group consisting of logo, trademark, service mark, trade name, brand message, phone number, symbols, advertising, internet website address, geographic directions, and radio station setting; interaction apparatus at the parking area for providing communication between a person at the traffic area and an entity remote from the traffic area; remote control apparatus for selectively activating the interaction apparatus; wherein the interaction apparatus is electrically powered and the signage system also includes solar power apparatus for providing electrical power to the interaction apparatus; wherein the entity is from the group consisting of a live person, a business, a database, security personnel, and a message playback system; wherein the traffic area is a parking lot, a roadway, a crosswalk, or a flooring area; wherein the sign apparatus includes traffic marking tape which has thereon or therein information indicia; wherein the traffic area includes pavement and the sign apparatus is applied to the pavement; wherein the sign apparatus includes at least one electronic display apparatus for presenting information to a person at the traffic area; wherein the at least one electronic display apparatus is from the group consisting of screen, panel, flat screen, back-lit panel, back-lit screen, and video monitor; switch apparatus interconnected with the at least one electronic display for selective activation of the at least one electronic display; remote control apparatus for selectively activating the at least one electronic display; wherein the at least one electronic display presents a static image; wherein the at least one electronic display presents a series of images presented sequentially; wherein the at least one electronic display presents a series of moving images; wherein the at least one electronic display is electrically powered and the signage system includes solar power apparatus for providing electrical power to the at least one electronic display; wherein the markers include at least one curb; and/or camera apparatus at the traffic area.

The present invention, therefore, provides in certain, but not necessarily all, embodiments a signage system for a traffic area, the traffic area with visually-identifiable markers, the signage system with sign apparatus at the markers, the sign apparatus visually viewable by a person adjacent the markers, interaction apparatus at the parking area for providing communication between a vehicle occupant at the traffic area and an entity remote from the traffic area, wherein the entity is from the group consisting of a live person, a business, a database, security personnel, and a message playback system, wherein the traffic area is from the group consisting of parking lot, roadway, and crosswalk, wherein the traffic area includes pavement and the sign apparatus is applied to the pavement, wherein the sign apparatus includes at least one electronic display apparatus for presenting information to a person at the traffic area, and wherein the at least one electronic display apparatus is from the group consisting of screen, panel, flat screen, back-lit panel, back-lit screen, and video monitor.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

What is claimed is:

1. A signage system for a traffic area, the traffic area comprising visually-identifiable boundary markers, the signage system comprising sign means on parking space lines comprising boundary markers for defining parking spaces, the sign means visually viewable by a person adjacent the boundary markers in a parking space defined by the boundary markers, interaction apparatus at the parking area for providing communication between a vehicle occupant at the traffic area and a person remote from the traffic area, wherein the traffic area is from the group consisting of parking lot and roadway, wherein the traffic area includes pavement and the sign means is applied to the pavement, wherein the sign means includes at least one electronic display apparatus for presenting information to a person at the traffic area, and wherein the at least one electronic display apparatus is from the group consisting of screen, panel, flat screen, back-lit panel, back-lit screen, and video monitor.

2. The signage system of claim 1 wherein the traffic area is a parking lot.

3. The signage system of claim 1 wherein the traffic area is a roadway.

4. The signage system of claim 1 wherein the sign means includes traffic marking tape which has thereon or therein information indicia.

5. The signage system of claim 1 wherein the traffic area includes pavement and the sign means is applied to the pavement.

6. The signage system of claim 5 wherein the sign means includes at least one electronic display apparatus for presenting information to a person at the traffic area.

7. The signage system of claim 6 wherein the at least one electronic display apparatus is from the group consisting of screen, panel, flat screen, back-lit panel, back-lit screen, and video monitor.

8. The signage system of claim 6 further comprising switch apparatus interconnected with the at least one electronic display for selective activation of the at least one electronic display.

9. The signage system of claim 6 further comprising remote control apparatus for selectively activating the at least one electronic display.

10. The signage system of claim 6 wherein the at least one electronic display presents a static image.

11. The signage system of claim 6 wherein the at least one electronic display presents a series of images presented sequentially.

12. The signage system of claim 6 wherein the at least one electronic display presents a series of moving images.

13. The signage system of claim 6 wherein the at least a one electronic display is electrically powered and the signage system further comprises solar power means for providing electrical power to the at least one electronic display.

14. The signage system of claim 1 wherein the traffic area has at least one curb at an edge thereof.

15. The signage system of claim 1 further comprising camera means at the traffic area.

16. A signage system for a traffic area, the traffic area having visually-identifiable curbing, the signage system comprising a traffic area, curbing at the traffic area, the curbing comprising visually-identifiable curbing, sign means in the curbing, the sign means visually viewable by an occupant of a vehicle adjacent the curbing, at least one electronic display apparatus for presenting information to a person at the traffic area, and the at least one electronic display apparatus is from the group consisting of screen, panel, flat screen, back-lit panel, back-lit screen, and video monitor.

* * * * *